June 2, 1942.

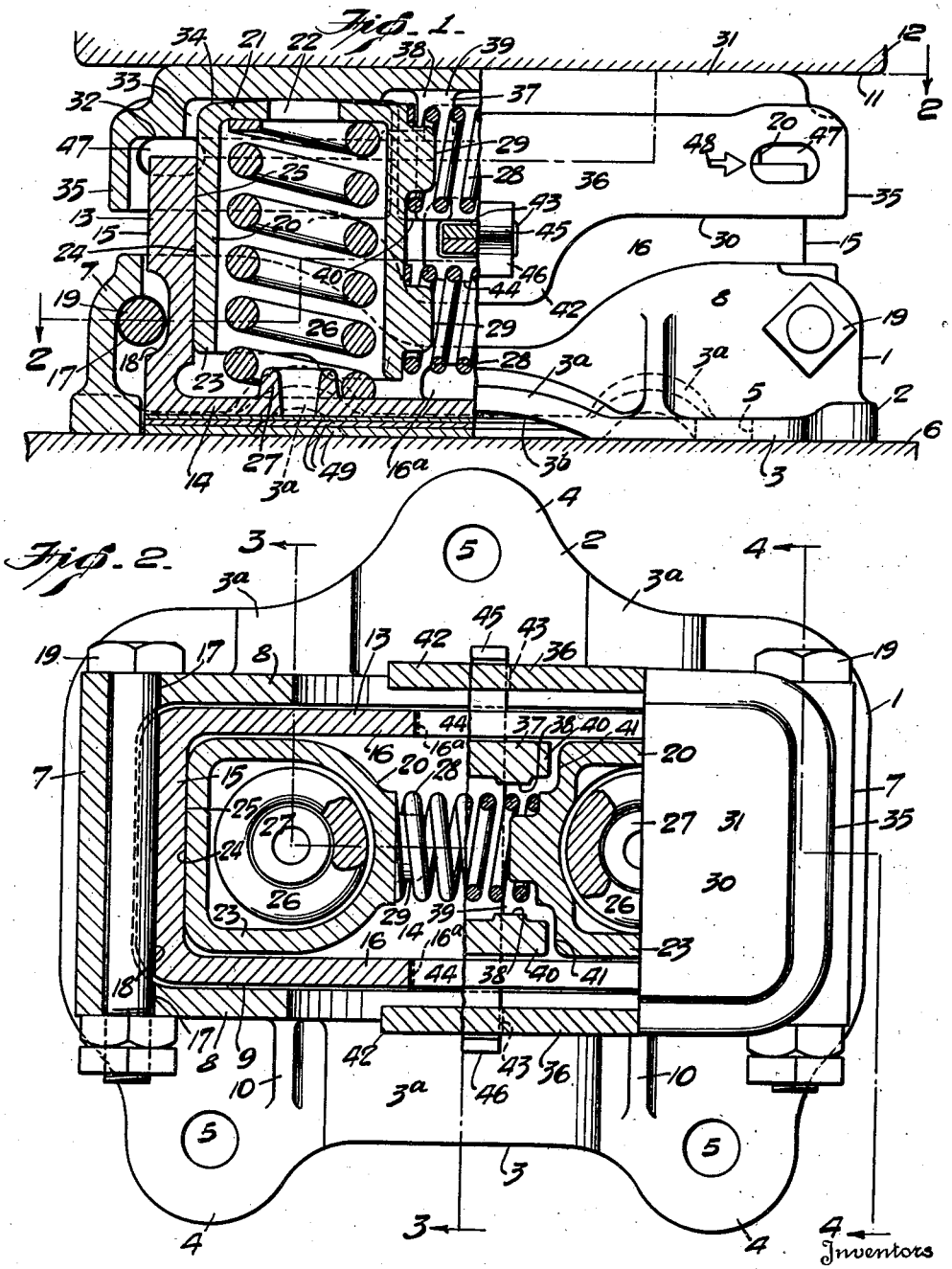

D. S. BARROWS ET AL 2,285,140

SIDE BEARING

Filed April 24, 1939

Inventors
DONALD S. BARROWS
CLARENCE J. LUSINK

By Ernest P. Mechlin
THEIR Attorney

Patented June 2, 1942

2,285,140

UNITED STATES PATENT OFFICE 2,285,140

SIDE BEARING

Donald S. Barrows and Clarence I. Lusink, Rochester, N. Y., assignors to The Symington-Gould Corporation, Rochester, N. Y., a corporation of Maryland Application April 24, 1939, Serial No. 269,737

12 Claims. (Cl. 308—138)

The invention relates to a cushioning mechanism especially adapted to be interposed between a truck member and a body member of a railway vehicle.

In the railroad industry it is the general practice to design bolsters forming a part of the superimposed body and truck structures of a railway vehicle so that a predetermined vertical space is provided between confronting surfaces of the bolsters at a position adjacent the transverse extremities of the bolsters or at a position inwardly of the sides of the vehicle. Occupying this aforementioned space is a side bearing which may be of the solid or resilient type to function as a means to limit the rolling or rocking action of a car body during service. If the side bearing employed is of the solid or rigid type, a clearance is provided between an uppermost surface thereof and an opposing or overlying surface on the body bolster so that the car body may oscillate or roll within certain limits to impart flexibility to the vehicle structure. If, on the other hand, a side bearing of the resilient type is employed, an uppermost surface thereof is arranged so as to be in constant contact with an opposing surface of the body bolster and the side bearing is arranged and constructed so that a predetermined compressive movement thereof is substantially equal to the clearance between a solid side bearing and an overlying body bolster surface. This latter type forms a means whereby the roll or oscillation of the car body is snubbed or cushioned to practically eliminate severe blows or impacts being transmitted to the car body in and adjacent the area of the side bearing.

With the above recitals foremost in mind, it is an object of the present invention to provide a side bearing of the resilient type wherein the overall height thereof may be varied so as to normally position a top or uppermost surface of the side bearing in constant contact with an overlying body bolster or confronting surface and at the same time maintain a predetermined compressive movement of the side bearing.

Another object of the invention is to provide a side bearing having a portion thereof adapted to be secured to a truck bolster, the associated parts being easily removable therefrom in order that the overall height of the side bearing may be varied without disturbing the portion secured to the truck bolster.

A further object of the invention is the provision, in a side bearing, of indicia means whereby the compressive movement of the side bearing from normal position may be determined.

A still further object of the invention is to provide and arrange, in a side bearing, communicating ports, apertures or conduits whereby foreign substance within the side bearing may pass to the exterior thereof so as not to interfere with the successful operation of the side bearing.

Other objects and advantages of the present invention will become apparent from the succeeding description of the illustrated form of the invention disclosed in the accompanying drawings wherein:

Figure 1 is a partial vertical sectional and partial side elevational view of a side bearing exemplifying a form and embodying features of the present invention.

Figure 2 is a view taken along the lines 2—2 of Figure 1, looking in the direction of the arrows; the view being taken through spaced horizontal planes to more clearly illustrate the construction and association of parts.

Figure 3:
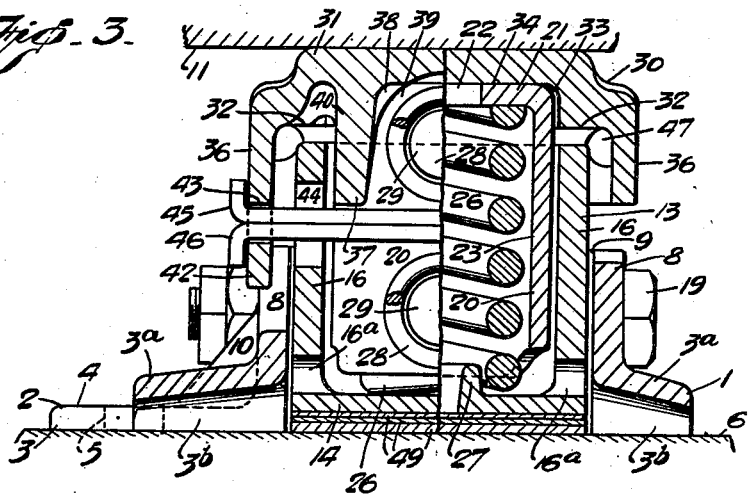
Figure 3 is a vertical sectional view taken along the lines 3—3 of Figure 2, looking in the direction of the arrows.
Figure 4:
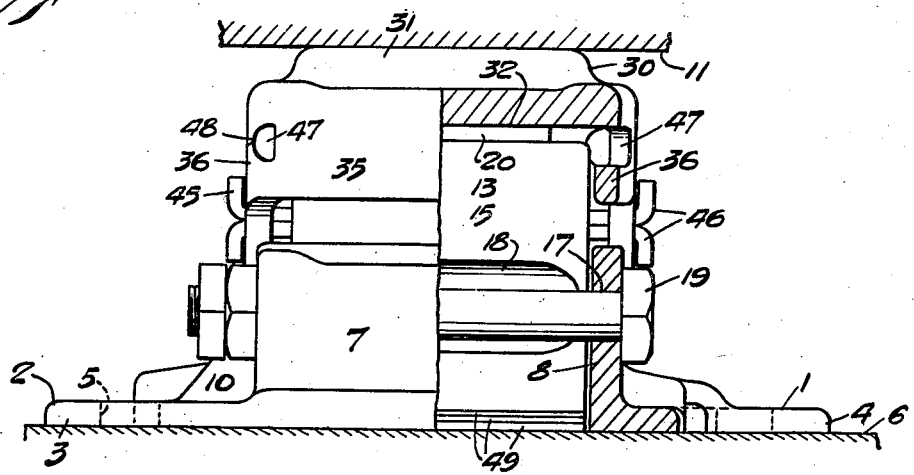
Figure 4 is a vertical end elevational and cross-sectional view taken along the lines 4—4 of Figure 2, looking in the direction of the arrows.

Referring now in detail to the various figures of the drawings which disclose an exemplary form of the invention and wherein like reference characters indicate like parts, the side bearing, designated generally by the numeral 1, is, as previously indicated, of the resilient type and capable of expanding and compressing from the illustrated normal position or relation of parts.

The side bearing comprises a shallow base member, sleeve or casing 2 formed, in part, by a lower plate 3 presenting wing-like extensions 4 apertured, as at 5, to accommodate securing means (not shown) of any nature or character for the retention of the sleeve in a fixed predetermined position. The lower plate is in bearing relation with a truck bolster the top surface only of which is shown and indicated by the character 6 to be supported thereby at a position or location adjacent the transverse extremity of the bolster. As will be understood, the sleeve or casing may, if desired, be formed integrally with the truck bolster and thereby eliminate the necessity of the lower plate. Upstanding from the base plate are longitudinally spaced substantially vertical end walls 7 joined or connected adjacent their transverse extremities by substantially vertical, laterally spaced side walls 8 to form a confined area 9 therebetween for the purpose to be hereinafter explained. At least one of the side walls, preferably the outer thereof, is reinforced against thrusts which may be imparted thereto during service by triangular gussets 10. The lower plate 3 preferably does not extend to within the confines of the end and side walls or, in other words, terminates in the vertical plane of the inner surfaces of the end and side walls, and for this reason the overall height of the side bearing can be maintained within a desired dimension determined by the distance between the surface 6 of the truck bolster and a vertically spaced surface 11 of a body bolster 12, only a portion of the latter of which is illustrated. The sleeve lower plate is convoluted, as at 3ª, so as to define lower passageways 3ᵇ which communicate with the interior of the sleeve and present conduits by which any foreign substance formed or which may find its way to the interior of the side bearing may pass freely to the exterior of the side bearing.

Situated within the sleeve and occupying the confined area 9 thereof is an open-ended box-like container or housing 13 having a lower or bottom plate 14 terminating adjacent its periphery in upstanding substantially vertical end walls or abutments 15 spaced longitudinally of the housing and desirably spaced inwardly of the side bearing from the associated sleeve end walls. Side connecting members or walls 16 extending between and joining the housing abutments adjacent their transverse extremities are spaced inwardly of the side bearing from the associated sleeve side walls. The housing walls are desirably of greater height than the associated sleeve walls so as to accommodate the remaining structure of the side bearing, which will be hereinafter described. As will also be noted from the succeeding description, the sleeve merely functions as a means to retain the housing and related instrumentalities in a predetermined position relatively to the bolsters. The housing side walls, adjacent their lower extremities and in the proximity of the lower plate 14, are provided with elongated openings or ports 16ª forming outlets for any foreign substance which may find its way to the interior of the housing. The openings are arranged so that they communicate with the passageways 3ᵇ of the sleeve.

As a safety precaution and in order to avoid an accidental or unwarranted separation of the sleeve and housing, removable means of any nature, construction or arrangement is associated with the sleeve and housing. Illustrative of this, the sleeve side walls, preferably adjacent and inwardly of the sleeve end walls, are provided with aligned apertures 17 spaced longitudinally of the side bearing. In substantial transverse and horizontal alignment with the sleeve apertures 17 are recesses, reliefs or indentures 18 in the housing abutments facing the associated sleeve end walls and elongated in a vertical direction to an extent greater than the associated sleeve apertures so as to render the housing adjustable. Extending through the sleeve apertures and occupying the housing recesses are transversely disposed means of any desired character which, in the instant structure, take the form of commercial bolts 19. As the bolts are fixed with respect to the sleeve and extend to within the confines of the housing abutments, the housing is freely adjustable in a vertical direction and its unwarranted displacement is positively prevented.

Positioned within and forming the means by which the compressive movement of the side bearing is resisted, as well as the means by which the side bearing assumes its expanded and normal position, are longitudinally spaced movable hollow or inverted cup-shaped shoes or friction members 20 each comprising an upper or closing piece or plate 21 disposed in a horizontal plane spaced above the upper extremity of the housing walls. Each closing piece, being apertured as at 22 to lighten the structure, terminates in a downwardly extending preferably continuous peripheral flange 23 which presents an outwardly facing plane substantially vertical and transverse bearing surface 24 in intimate contact with an inwardly facing surface 25 on the associated housing abutment 15. The shoes are capable of movement in a vertical direction, and any movement of the shoes relative to the housing will result in the creation of frictional forces being generated on the juxtapositioned surfaces 24 and 25 to assist in producing a resilient side bearing of a given capacity. It is to be noted that the thickness of the housing end walls is considerably greater than that of the side walls to especially provide for wear therein during service, and for this reason the life or usefulness of the side bearing will be extended.

Located within the shoes and substantially completely encased thereby are resilient means 26, of any nature or character, reacting in a vertical direction and in bearing relation with the housing bottom plate and shoe closing piece to function as a means whereby, during the compressive movement of the side bearing, the downward movement of the shoes is resiliently resisted, and, during the expansive movement of the side bearing, the shoes are urged in an upward direction outwardly of the housing. Since the resilient means urge the shoes and housing apart, it is for this reason, therefore, that, as previously stated, no additional means is normally required to retain the housing and sleeve in assembled relation but that the bolt arrangements are employed to merely avoid an unwarranted separation of the housing and sleeve. The resilient means, exemplified in the present structure by coil or helical springs, ordinarily require the introduction of no additional instrumentalities to retain them in a predetermined position, but since the fracture of the lowermost coil or coils thereof may result in the severed piece shifting horizontally of the side bearing to foul or interfere with the free vertical movement of the shoes and thereby defeat a full compressive movement of the side bearing, centering nibs or embossments 27 upstand from the housing bottom plate to extend within the lower or adjacent extremity of the associated spring means.

Spaced vertically of the side bearing is a plurality of means, preferably of the resilient type and illustrated in the accompanying drawings as coil or helical springs 28, interposed between and reacting against the shoes to urge them longitudinally of the side bearing. The springs 28, movable vertically and carried by the shoes, urge and retain the shoe surfaces 24 in bearing relation with the housing abutment surfaces 25. The shoe flanges are provided with vertically spaced studs 29 projecting toward the center of the side bearing toward one another to within the springs in order to retain them in position or spaced relation.

Forming a body side bearing engaging means and a closure member for the upper extremity of the side bearing is a cap or cover 30 comprising a top or upper bearing plate 31 positioned in a horizontal plane a predetermined distance above the associated extremity of the housing to bear upon and be supported by the shoe closing pieces 21. The cover is offset adjacent its periphery to present a continuous downwardly facing shoulder 32 directly overlying the housing side and end walls in spaced relation and by an amount determinative of the compressive movement of the side bearing. The shoulder defines a downwardly facing pocket 33 accommodating the upper extremities of the shoes and is spaced a sufficient distance from the shoes to allow the cap to move horizontally with respect to the shoes, housing and sleeve, thereby incorporating a desired degree of flexibility in the side bearing by permitting the cap to assume an abnormal position with the remaining elements from the illustrated normal relation. To increase the flexibility of the structure as well as insure a bearing relation between the engaging shoes and housing surfaces at all times throughout the entire range of shoe movement, the uppermost portions of the shoe closing plates are crowned or arcuate to present convex surfaces 34, illustrated as cylindrical but which, if desired, may be of spherical configuration. If, therefore, one end of the side bearing is compressed to a degree greater than the other end thereof, the cap will, in a sense, rock on the shoes and thus avoid creating any abnormal stresses tending to cock the shoes or, in other words, angularly move the shoe surfaces 24 away from the housing surfaces 25 so as to defeat the surface bearing relation of appreciable area between the shoes and housing.

The cover shoulder terminates in longitudinally spaced depending end flanges 35 joined by depending transversely spaced side flanges 36, all of which overlap the upper extremities and are positioned outwardly of associated housing end and side walls, respectively. The clear opening into the housing is, therefore, substantially completely covered by the cap or closure member to exclude water or foreign substance from the interior of the side bearing. Sufficient clearance is provided between the cap flanges and housing walls so as to prevent contact therebetween during service and thereby eliminate an otherwise occasional creation of forces which would build up a false capacity or vary the capacity of the side bearing and subject the cap flanges and housing walls to wear other than the intended wear of the housing end walls or abutments for which express provisions have been made. Depending downwardly from the top bearing plate of the closure member to within the housing is a pendant 37 comprising longitudinally spaced end legs 38 closely associated with the shoe flanges and provided with inverted U-shaped apertures 39 to accommodate the uppermost spring of the resilient means 28. The end legs, adapted to engage the associated shoe flanges to thereby limit the longitudinal movement of the closure member with respect to the shoes and remaining structure of the side bearing, are joined by longitudinally directed transversely spaced side legs 40 preferably extending beyond the end legs toward the respective shoes to have their projecting ends positioned within recesses 41 provided in the shoes. The side legs reinforce the end legs against thrusts which may be imparted thereto during movement of the cap longitudinally of the side bearing.

Forming a continuation of the closure member side flanges intermediate their ends are extensions or arms 42 provided with aligned apertures 43 adjacent the lower extremities thereof. The apertures 43 are in substantial alignment with but of lesser extent than elongated apertures 44 provided in the housing side walls intermediate their height. Extending transversely of the side bearing and horizontally between the springs of the resilient means 28 is a key or retaining means 45 which occupies the cap apertures and moves with the cap to function as a means for retaining the housing and closure member, together with the included instrumentalities, in assembled relation. The key is preferably formed of two counterpart strips or bars 46 which extend through the housing apertures 44 and cap apertures 43 to have their ends, positioned outwardly of the closure member, spread apart or bent in opposite directions to prevent their accidental displacement. Due to the close proximity of the bars to the springs 28 and their attachment to the closure member, the apertures 44 are made preferably greater than the cap apertures 43, and accordingly the side bearing is free to expand or be compressed from the normal illustrated position and the cap may move longitudinally with respect to the housing without interference between the key and housing.

The closure member side flanges, adjacent their juncture with the end flanges, are provided with openings or windows 47 which expose a portion of the upper extremity of the housing as well as make the clearance between the shoulder and housing walls visible without dismantling or disturbing the assembled structure. Formed on the outer surface of the cap side flanges are indicia means 48 represented by arrows directed toward the horizontal center line of the associated windows. As the compressive movement of the side bearing is determined by the permissible or predetermined rock or roll of the vehicle body, the side bearing is designed so that the indicia means are, when assembled with a railway vehicle, in horizontal alignment with the upper extremity of the housing walls so that the distance between the upper extremity of the housing walls and the cap shoulder 32 is equal to the permissible roll of the vehicle body.

In order to compensate for manufacturing tolerances the side bearing is made adjustable, and by reason of this construction a predetermined compressive movement of the side bearing can be definitely maintained irrespective of the occupied distance between the bolster surfaces 6 and 11. To accomplish this result and as has been previously indicated, the housing and its contained elements or structure are movable as a unit in a vertical direction relatively to the sleeve. Shim or adjusting plates 49 of a quantity which may vary as desired are inserted within the side bearing in underlying supporting relation with the housing to be confined therein by the sleeve. Upon application of a side bearing to a railway vehicle the distance between the confronting bolster surfaces is determined and a sufficient number of adjusting plates is introduced in subjacent relation to the housing to align the indicia means with the upper extremity of the housing walls. Another distinct advantage gained by the employment of the adjusting plates is that after prolonged service the cap, due to its movement horizontally with respect to the superimposed and engaging body bolster, will wear, resulting in an increase in the distance between the housing walls and the cap shoulder. When sufficient wear has taken place in the cap bearing plate to warrant a readjustment of the elements an additional adjusting plate can be inserted to raise the housing so that the upper extremities of the walls thereof are again aligned with the indicia means.

It will, of course, be clearly understood that the indicia means may be entirely dispensed with and a suitable gauge temporarily inserted in the window opening to determine the distance between the housing walls and cap shoulder.

Various changes and alterations may be made in and to the illustrated construction without departing from within the spirit and scope of the appended claims.

We claim:

1. In a side bearing, in combination, a sleeve, a housing positioned within and movable with respect to said sleeve, a cover adapted to move horizontally relatively to said housing, means within said housing for resisting movement of said cover toward said housing, and means movably associated with said housing and removably associated with said sleeve for preventing separation therebetween.

2. In a side bearing, in combination, a sleeve, a housing positioned within and movable with respect to said sleeve, a cover adapted to move relatively to said housing and connected thereto, friction means within said housing for resiliently resisting movement of said cover toward said housing, and means within said sleeve and underlying said housing for maintaining said housing in a predetermined elevated position.

3. In a side bearing, in combination, an adjustable housing, a cover adapted to move relatively to said housing and having a plate portion spaced above an extremity of said housing, a downwardly facing pocket in said cover, horizontally and vertically acting friction means within said housing and extending into said cover pocket for resisting movement of said cover toward said housing, a flange depending from said plate portion having a window therein exposing said upper extremity, and indicia means on said flange adapted for alignment with said upper extremity to form a gauge whereby the distance between the plate portion and housing may be determined.

4. In a side bearing, in combination, a sleeve member, a housing member associated with and adapted to move relatively to said sleeve member, a cover spaced from and adapted to move horizontally relatively to said housing member, friction means within said housing member for resisting movement of said cover toward said housing member, and means removably secured to one of said members and adapted to be engaged by the other of said members for preventing separation of said members.

5. In a side bearing, in combination, a sleeve, a housing positioned within and spaced from said sleeve, a horizontally and vertically movable cover associated with an extremity of said housing, means within said housing and supporting said cover adapted to create frictional forces to cushion a movement of said cover, a relief in said housing, and means carried by said sleeve and extending into said relief for preventing separation of said sleeve and housing.

6. In a side bearing, in combination, a sleeve, a housing positioned within and spaced from said sleeve, a movable cover associated with an extremity of said housing, means within said housing and supporting said cover adapted to create frictional forces to cushion movement of said cover, an elongated relief in said housing, means associated with said sleeve and extending into said relief for preventing separation of said sleeve and housing, and means within said sleeve and underlying another end of said housing for determining the relation between said sleeve and housing.

7. In a side bearing, in combination, a sleeve, a housing positioned within and spaced from said sleeve, a movable cover associated with an extremity of said housing, means within said housing and supporting said cover adapted to cushion the movement of said cover, means associated with said sleeve and housing for preventing separation therebetween, and an elongated relief in said housing accommodating said last-named means so as to make said housing adjustable.

8. In a side bearing adapted to be interposed between a relatively movable truck member and body member of a railway vehicle, in combination, a sleeve secured to said truck member, a housing positioned within said sleeve and movable relatively thereto, a cover having a plate portion spaced above said housing adapted to move toward and away from said housing, said plate portion being in contact with said body member, friction means positioned within said housing and supporting said cover, and adjusting means associated with said housing for determining the travel of said plate toward said housing.

9. In a side bearing, in combination, a sleeve formed of a base plate and upstanding walls, a housing within said sleeve spaced from said walls, a cover telescoping an extremity of said housing and having a plate portion normally spaced above said extremity, means positioned above said sleeve and connecting said housing and cover for retaining them in assembled relation while permitting movement of said cover relatively to said housing, resilient means within said housing for supporting said cover, an aperture in said housing, and a convolution in said base plate defining an access opening therein, said aperture and access opening forming a communication from the interior of the side bearing for the escape of foreign substance.

10. In a side bearing, in combination, an apertured sleeve having a bottom surface, a housing positioned within said sleeve and having a recess in substantial alignment with said sleeve aperture, means extending through said aperture and positioned in said recess for preventing separation of said sleeve and housing, a cover normally spaced above said housing and having a top surface, means within said housing for supporting said cover, and adjusting means positioned in said sleeve and associated with said housing for maintaining said housing in a predetermined position intermediate said top and bottom surfaces.

11. In a side bearing, in combination, a sleeve comprising a lower plate, connected walls upstanding from said lower plate forming a confined area therebetween, said plate extending to adjacent inner surfaces of said walls, a housing positioned within said confined area and adapted to be moved relatively to said sleeve, a horizontally and vertically movable cover overlying and connected to said housing, means within said housing for resisting movement of said cover toward said housing, and means within said sleeve and underlying said housing for maintaining said housing in a predetermined elevated position, said means lying in the plane of said lower plate.

12. In a side bearing, in combination, a sleeve comprising a lower plate, walls upstanding from said lower plate and confining an area therebetween, a housing occupying said confined area, a cover overlying and connected to said housing being adapted to move relatively to said housing, friction means positioned within said housing in underlying supporting relation with said cover for cushioning the movement of said cover toward said housing, and removable means underlying said housing in the plane of said lower plate for maintaining said housing in a predetermined elevated position.

DONALD S. BARROWS.
CLARENCE I. LUSINK.